US012726812B2

(12) United States Patent
Balevi et al.

(10) Patent No.: US 12,726,812 B2
(45) Date of Patent: Sep. 1, 2026

(54) MODEL IDENTIFICATION USING USER EQUIPMENT CAPABILITY INDICATOR

(71) Applicant: QUALCOMM Incorporated, San Diego, CA (US)

(72) Inventors: Eren Balevi, Brooklyn, NY (US); Taesang Yoo, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 18/592,990

(22) Filed: Mar. 1, 2024

(65) Prior Publication Data

US 2024/0397306 A1 Nov. 28, 2024

Related U.S. Application Data

(60) Provisional application No. 63/504,381, filed on May 25, 2023.

(51) Int. Cl.
*H04W 8/22* (2009.01)
*H04W 24/02* (2009.01)
*H04W 76/20* (2018.01)

(52) U.S. Cl.
CPC ............ *H04W 8/22* (2013.01); *H04W 24/02* (2013.01); *H04W 76/20* (2018.02)

(58) Field of Classification Search
CPC ........ H04W 8/22; H04W 24/02; H04W 76/20
See application file for complete search history.

(56) References Cited

U.S. PATENT DOCUMENTS

2023/0006913 A1* 1/2023 Lo ...................... H04L 41/0853
2024/0196230 A1* 6/2024 Esswie ................. H04W 24/02

* cited by examiner

*Primary Examiner* — Brenda H Pham
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may transmit a UE capability reporting message including information associated with identifying a set of UE conditions associated with a first set of functionalities, wherein the first set of functionalities corresponds to a set of model features. The UE may receive, based at least in part on transmitting the UE capability reporting message, control signaling identifying a second set of functionalities that is a subset of the first set of functionalities. Numerous other aspects are described.

20 Claims, 14 Drawing Sheets

400

Figure 5:
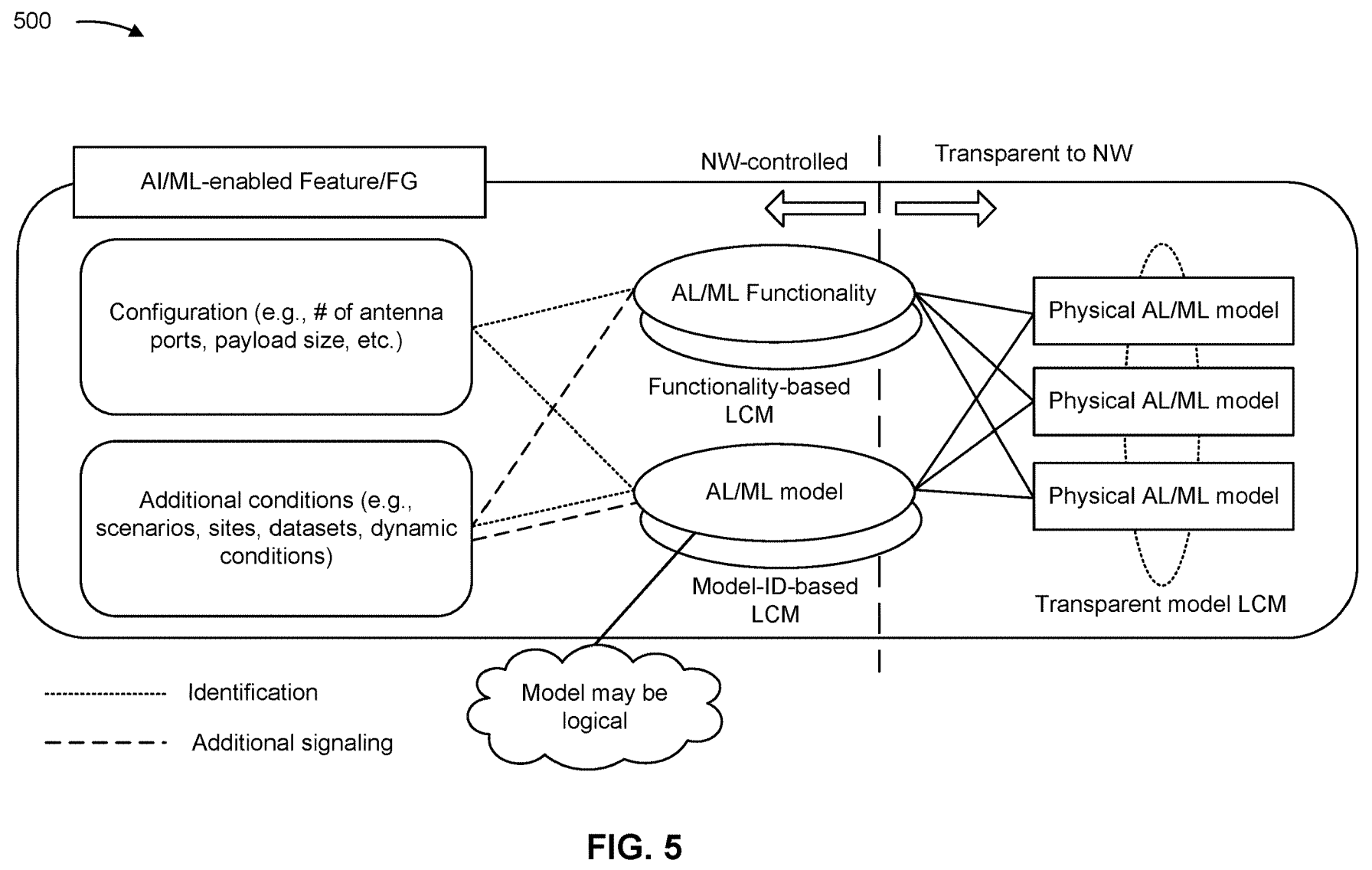

500

AI/ML-enabled Feature/FG

Configuration (e.g., # of antenna ports, payload size, etc.)

Additional conditions (e.g., scenarios, sites, datasets, dynamic conditions)

NW-controlled

Transparent to NW

AL/ML Functionality

Functionality-based LCM

AL/ML model

Model-ID-based LCM

Model may be logical

Physical AL/ML model

Physical AL/ML model

Physical AL/ML model

Transparent model LCM

Identification

Additional signaling

700
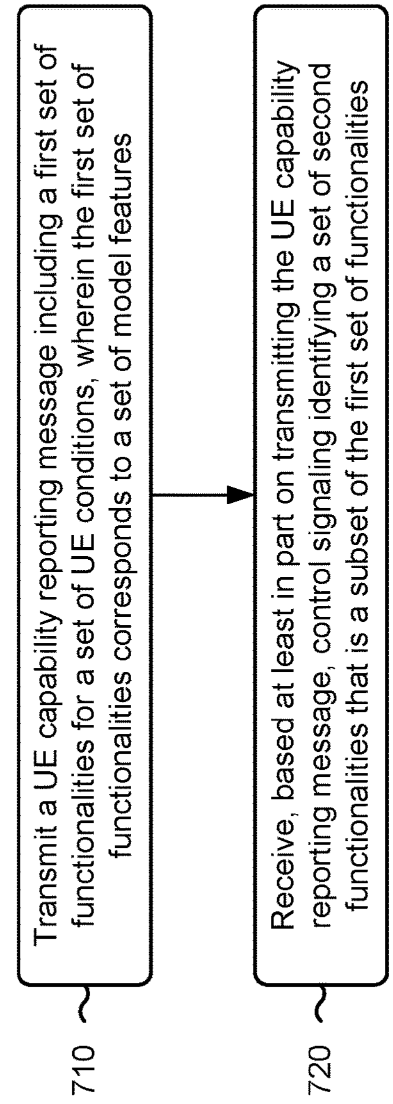

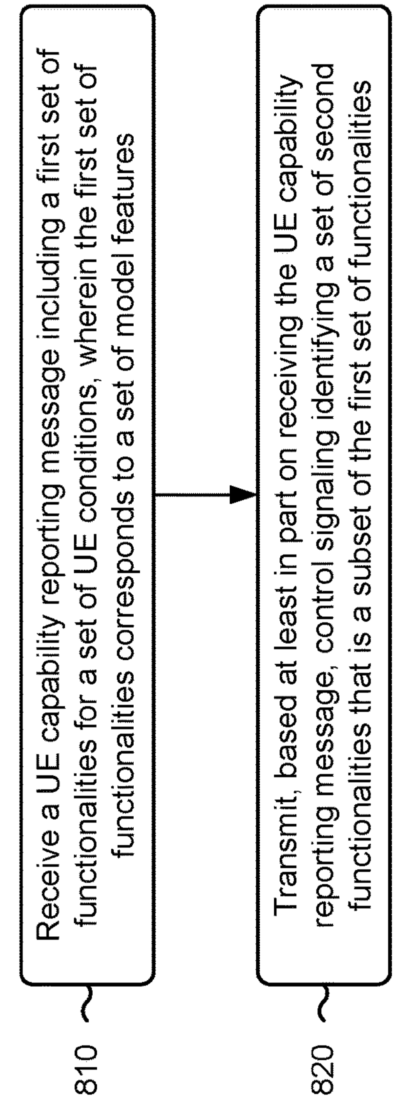
FIG. 8

MODEL IDENTIFICATION USING USER EQUIPMENT CAPABILITY INDICATOR

CROSS-REFERENCE TO RELATED APPLICATION

This Patent application claims priority to U.S. Provisional Patent Application No. 63/504,381, filed on May 25, 2023, entitled "MODEL IDENTIFICATION USING USER EQUIPMENT CAPABILITY INDICATOR," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for model identification using a user equipment (UE) capability indicator.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting a UE capability reporting message including a set of UE conditions associated with the first set of functionalities, wherein the first set of functionalities corresponds to a set of model features. The method may include receiving, based at least in part on transmitting the UE capability reporting message, control signaling identifying a second set of functionalities that is a subset of the first set of functionalities.

Some aspects described herein relate to a method of wireless communication performed by a network node. The method may include receiving a UE capability reporting message including a set of UE conditions associated with the first set of functionalities, wherein the first set of functionalities corresponds to a set of model features. The method may include transmitting, based at least in part on transmitting the UE capability reporting message, control signaling identifying a second set of functionalities that is a subset of the first set of functionalities.

Some aspects described herein relate to a UE for wireless communication. The UE may include one or more memories and one or more processors coupled to the one or more memories. The one or more processors, individually or in any combination, may be operable to cause the UE to transmit a UE capability reporting message including information associated with identifying a set of UE conditions associated with a first set of functionalities, wherein the first set of functionalities corresponds to a set of model features. The one or more processors, individually or in any combination, may be operable to cause the UE to receive, based at least in part on transmitting the UE capability reporting message, control signaling identifying a second set of functionalities that is a subset of the first set of functionalities.

Some aspects described herein relate to a network node for wireless communication. The network node may include one or more memories and one or more processors coupled to the one or more memories. The one or more processors, individually or in any combination, may be operable to cause the network node to receive a UE capability reporting message including information associated with identifying a set of UE conditions associated with a first set of functionalities, wherein the first set of functionalities corresponds to a set of model features. The one or more processors, individually or in any combination, may be operable to cause the network node to transmit, based at least in part on transmitting the UE capability reporting message, control signaling identifying a second set of functionalities that is a subset of the first set of functionalities.

Some aspects described herein relate to a non-transitory computer-readable medium that stores a set of instructions for wireless communication by a UE. The set of instructions, when executed by one or more processors of the UE, may cause the UE to transmit a UE capability reporting message including information associated with identifying a set of UE conditions associated with a first set of functionalities, wherein the first set of functionalities corresponds to a set of model features. The set of instructions, when executed by one or more processors of the UE, may cause the UE to receive, based at least in part on transmitting the UE capability reporting message, control signaling identifying a second set of functionalities that is a subset of the first set of functionalities.

Some aspects described herein relate to a non-transitory computer-readable medium that stores a set of instructions for wireless communication by a network node. The set of instructions, when executed by one or more processors of the network node, may cause the network node to receive a UE capability reporting message including information associated with identifying a set of UE conditions associated with a first set of functionalities, wherein the first set of functionalities corresponds to a set of model features. The set of instructions, when executed by one or more processors of the network node, may cause the network node to transmit, based at least in part on transmitting the UE capability reporting message, control signaling identifying a second set of functionalities that is a subset of the first set of functionalities.

Some aspects described herein relate to an apparatus for wireless communication. The apparatus may include means for transmitting a UE capability reporting message including information associated with identifying a set of UE conditions associated with a first set of functionalities, wherein the first set of functionalities corresponds to a set of model features. The apparatus may include means for receiving, based at least in part on transmitting the UE capability reporting message, control signaling identifying a second set of functionalities that is a subset of the first set of functionalities.

Some aspects described herein relate to an apparatus for wireless communication. The apparatus may include means for receiving a UE capability reporting message including information associated with identifying a set of UE conditions associated with a first set of functionalities, wherein the first set of functionalities corresponds to a set of model features. The apparatus may include means for transmitting, based at least in part on transmitting the UE capability reporting message, control signaling identifying a second set of functionalities that is a subset of the first set of functionalities.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of a representation of AI/ML models in a telecommunications network, in accordance with the present disclosure.

FIG. 7 is a diagram illustrating an example process performed, for example, by a UE, in accordance with the present disclosure.

FIG. 8 is a diagram illustrating an example process performed, for example, by a network node, in accordance with the present disclosure.

DETAILED DESCRIPTION

Figure 1:
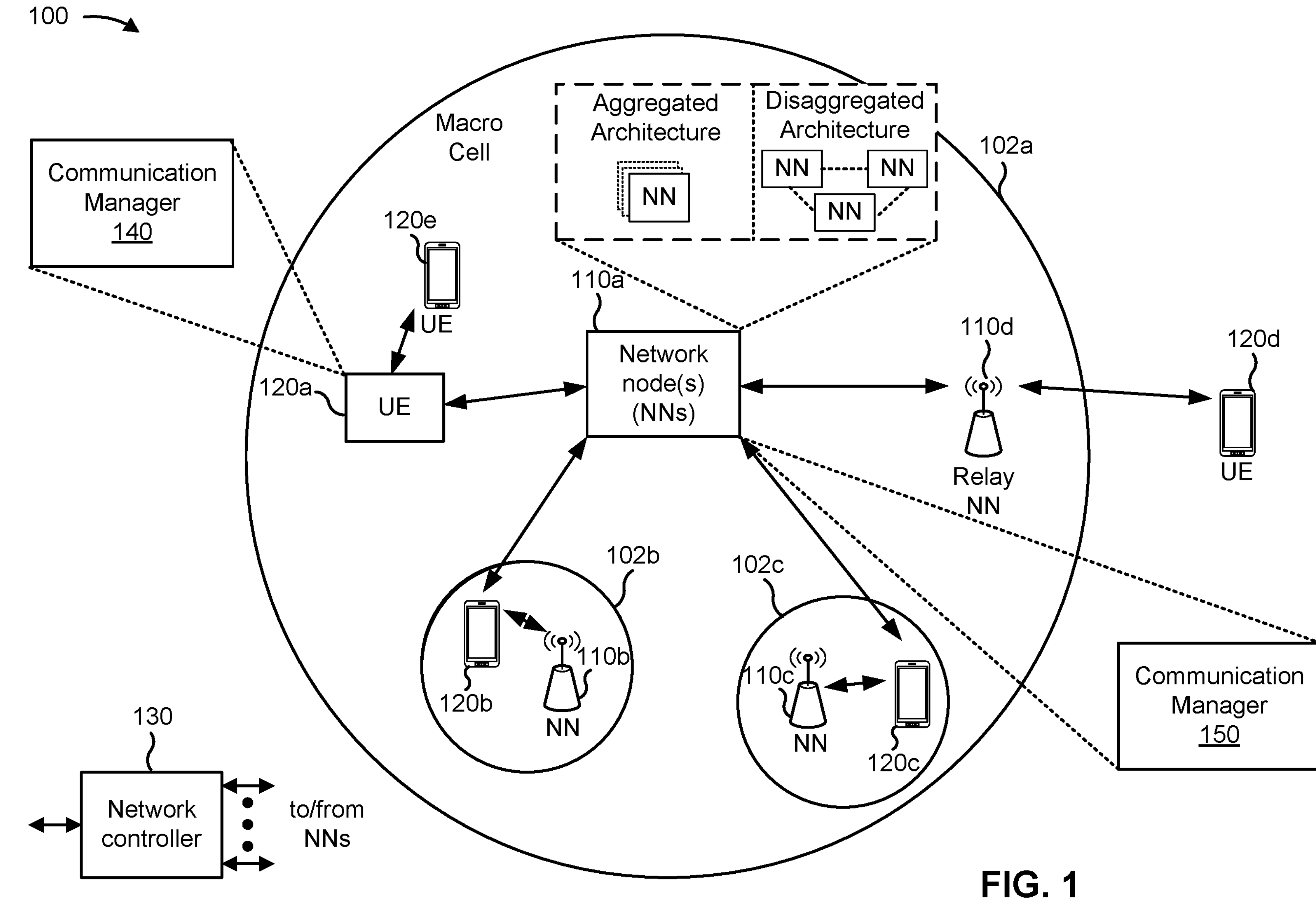
FIG. 1 is a diagram illustrating an example of a wireless network, in accordance with the present disclosure.

In some communications systems, such as in a telecommunications network, a network service provider may deploy models for use in analyzing parameters associated with the telecommunications network. In one example, a user equipment (UE) may use a model, such as an artificial intelligence (AI) or machine learning (ML) (AI/ML) model, to analyze a set of measurements of a network and select a beam to use for communication in a cell of the network. Similarly, a network node may use a model to analyze network utilization by a set of UEs and predict resource allocations to assign to a UE based on the network utilization. It is contemplated that many other use cases are possible for using an AI/ML model in a telecommunications network or another complex system. Two different AI/ML model management and control types that can be deployed for use in connection with a network are functionality-based life cycle management (LCM) and model identification (model-ID)-based LCM.

A physical AI/ML model may apply to one or more AI/ML functionalities or logical AI/ML models, each of which may correspond to one or more AI/ML-enabled features or feature groups, such as configurations or conditions. A UE may identify a set of conditions and may signal the set of conditions to a network node. The network node may determine a first set of functionalities, which may be configurable functionalities for AI/ML models, and the network node may configure some of the identified functionalities. The network node may activate a functionality that has been configured. The network node may transmit signaling identifying a second set of functionalities, which may include an activated functionalities.

Based at least in part on the UE and the network node using a UE capability reporting and control signaling, respectively, to convey information associated with AI/ML models, the UE and/or the network node may enable activation of AI/ML models. Further, the UE and the network node may unify functionality based LCM and model identification based LCM and provide for efficient signaling via a unified AI/ML framework. By enabling activation of AI/ML models, the UE and the network node conserve computing, power, network, and/or communication resources that may have otherwise been consumed using parameters determined using other, less accurate techniques. For example, based at least in part on the UE and the network node successfully deploying an AI/ML model for beam selection, the UE and the network node may communicate with a reduced error rate relative to a beam selected using another technique, which may conserve computing, power, network, and/or communication resources that may have otherwise been consumed to detect and/or correct communication errors.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node **110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110** is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term “cell” can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms “base station” or “network node” may refer to an aggregated base station, a disaggregated base station, an integrated access and backhaul (IAB) node, a relay node, or one or more components thereof. For example, in some aspects, “base station” or “network node” may refer to a CU, a DU, an RU, a Near-Real Time (Near-RT) RAN Intelligent Controller (RIC), or a Non-Real Time (Non-RT) RIC, or a combination thereof. In some aspects, the terms “base station” or “network node” may refer to one device configured to perform one or more functions, such as those described herein in connection with the network node 110. In some aspects, the terms “base station” or “network node” may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms “base station” or “network node” may refer to any one or more of those different devices. In some aspects, the terms “base station” or “network node” may refer to one or more virtual base stations or one or more virtual base station functions. For example, in some aspects, two or more base station functions may be instantiated on a single device. In some aspects, the terms “base station” or “network node” may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

A UE 120 and/or a network node 110 may include one or more chips, system-on-chips (SoCs), chipsets, packages, or devices that individually or collectively constitute or comprise a processing system. The processing system includes processor (or “processing”) circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 May communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHZ-7.125 GHZ) and FR2 (24.25 GHZ-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHZ). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit a UE capability reporting message including information associated with identifying a set of UE conditions associated with a first set of functionalities, wherein the first set of functionalities corresponds to a set of model features; and receive, based at least in part on transmitting the UE capability reporting message, control signaling identifying a second set of functionalities that is a subset of the first set of functionalities. Additionally, or alternatively, the communication manager 140 may perform one or more other operations described herein.

In some aspects, the network node 110 may include a communication manager 150. As described in more detail elsewhere herein, the communication manager 150 may receive a UE capability reporting message including information associated with identifying a set of UE conditions associated with a first set of functionalities, wherein the first set of functionalities corresponds to a set of model features; and transmit, based at least in part on transmitting the UE capability reporting message, control signaling identifying a second set of functionalities that is a subset of the first set of functionalities. Additionally, or alternatively, the communication manager 150 may perform one or more other operations described herein.

As indicated above, FIG. 1 is provided as an example. Other examples may differ from what is described with regard to FIG. 1.

Figure 2:
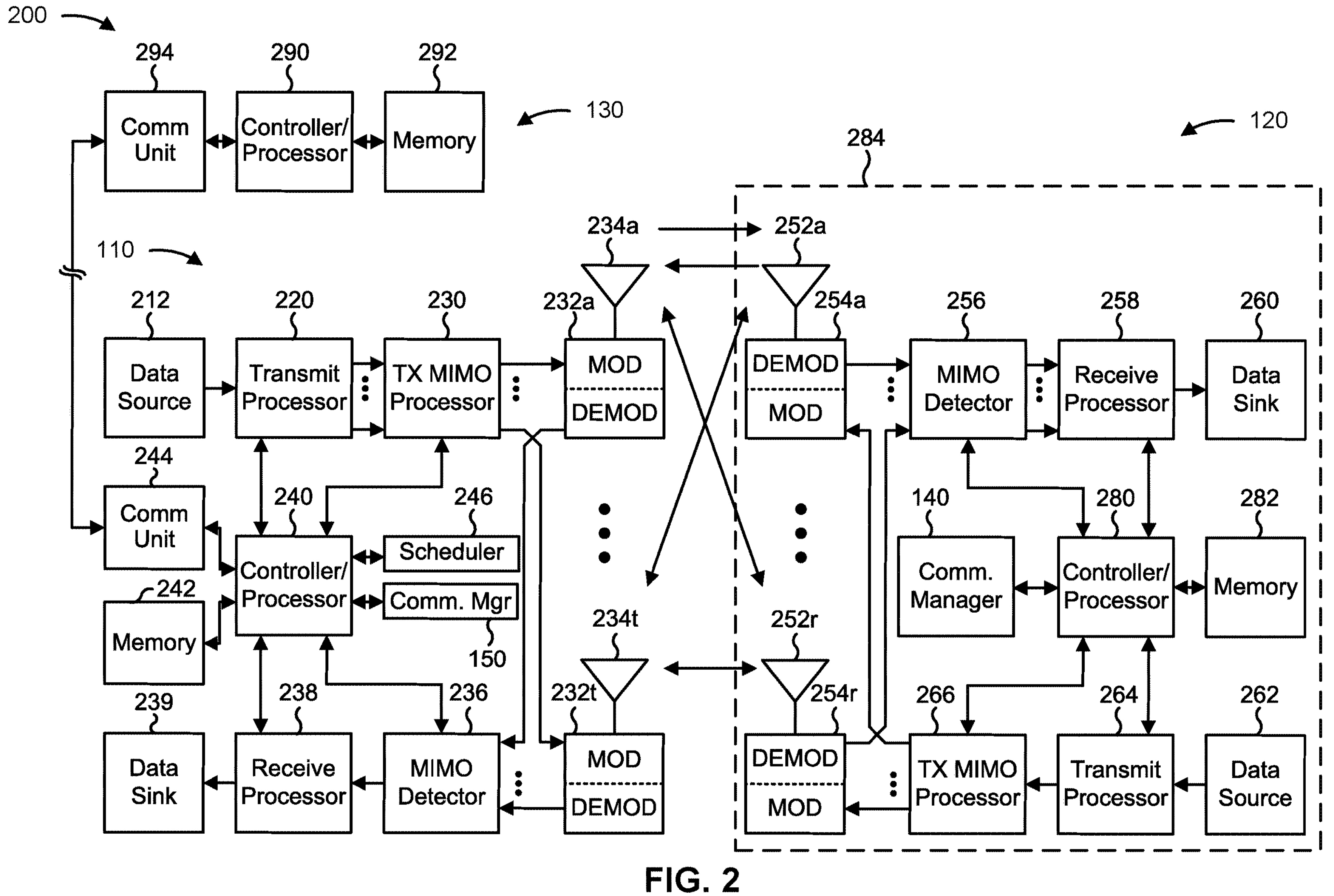
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-10).

The controller/processor 240 of the network node 110, the controller/processor 280 of the UE 120, and/or any other component(s) of FIG. 2 may perform one or more techniques associated with model identification using a UE capability indicator, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for transmitting a UE capability reporting message including information associated with identifying a set of UE conditions associated with a first set of functionalities, wherein the first set of functionalities corresponds to a set of model features; and/or means for receiving, based at least in part on transmitting the UE capability reporting message, control signaling identifying a second set of functionalities that is a subset of the first set of functionalities. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving a UE capability reporting message including information associated with identifying a set of UE conditions associated with a first set of functionalities, wherein the first set of functionalities corresponds to a set of model features; and/or means for transmitting, based at least in part on transmitting the UE capability reporting message, control signaling identifying a second set of functionalities that is a subset of the first set of functionalities. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
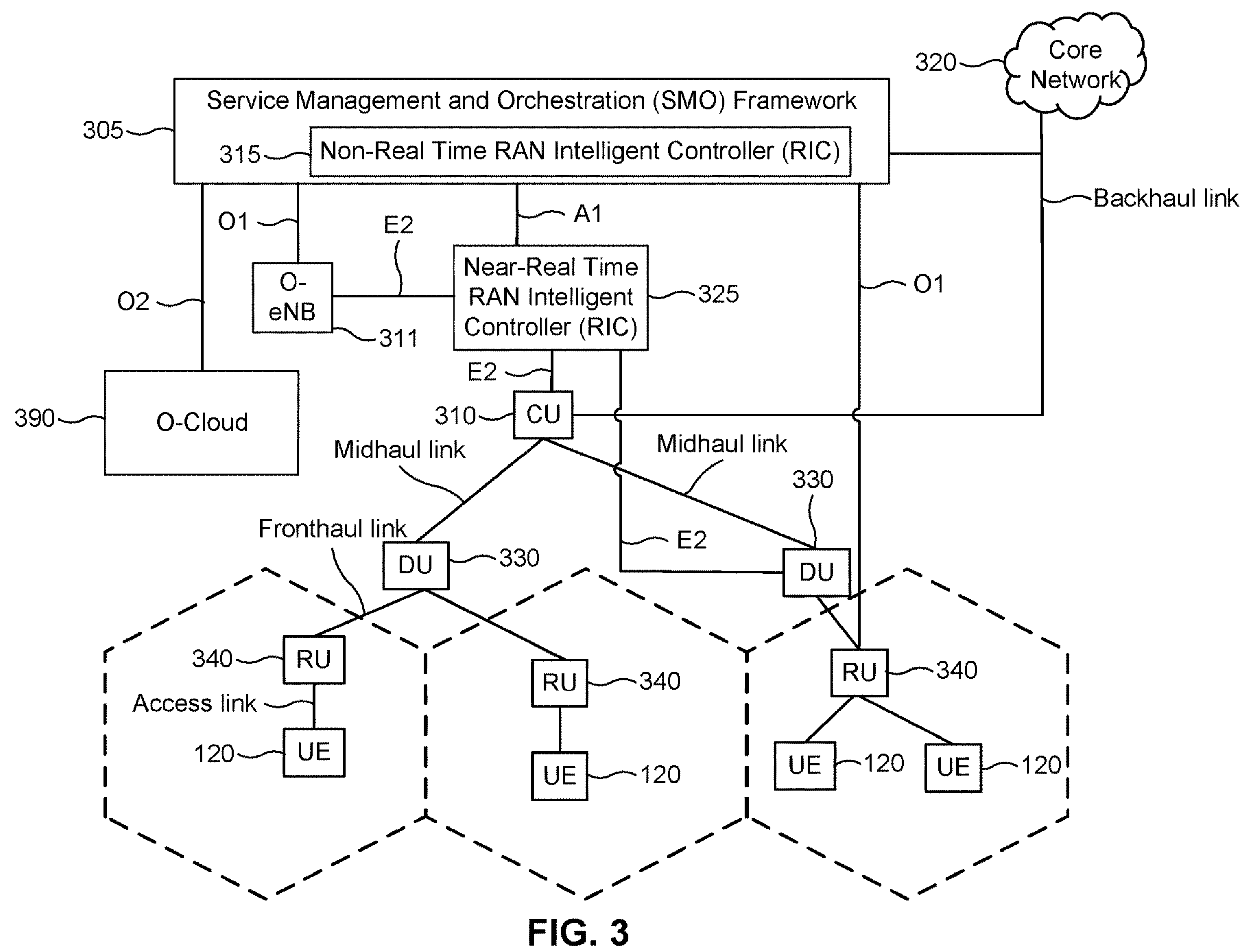
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUS 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, AI/ML workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
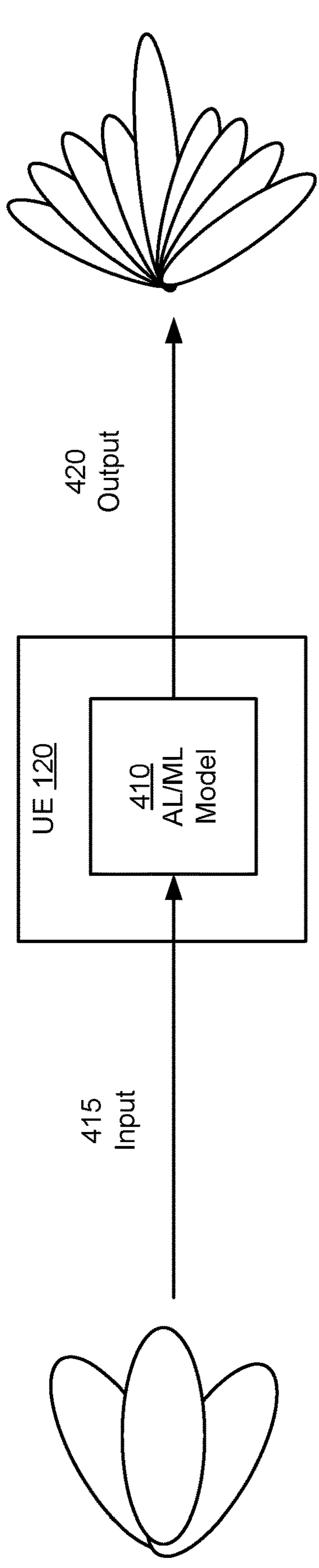
FIG. 4 is a diagram illustrating an example of using an artificial intelligence (AI)/machine learning (ML) model in a telecommunications network, in accordance with the present disclosure.

FIG. 4 is a diagram illustrating an example 400 of use of an AI/ML model in a telecommunications network, in accordance with the present disclosure. As shown in FIG. 4, an AI/ML model 410 may be deployed at or on a UE 120. The AI/ML model 410 may enable the UE 120 to determine one or more inferences or predictions based on data input to the AI/ML model 410.

For example, as shown by reference number 415, there may be an input to the AI/ML model 410. One specific example of an input may include measurements associated with a first set of beams. Other inputs are contemplated. Returning to the example, a network node 110 may transmit one or more signals using respective beams from the first set of beams. The UE 120 may perform measurements (e.g., L1 RSRP measurements or other measurements) of the first set of beams to obtain a first set of measurements. For example, each beam, from the first set of beams, may be associated with one or more measurements performed by the UE 120. The UE 120 may input the first set of measurements (e.g., L1 RSRP measurement values) into the AI/ML model 410 along with information associated with the first set of beams and/or a second set of beams, such as a beam direction (e.g., spatial direction), beam width, beam shape, and/or other characteristics of the respective beams from the first set of beams and/or the second set of beams.

As shown by reference number 420, the AI/ML model 410 may output one or more predictions. In the specific example described above, the one or more predictions may include predicted measurement values (e.g., predicted L1 RSRP measurement values) associated with the second set of beams. This may reduce a quantity of beam measurements that are performed by the UE 120, thereby conversing power of the UE 120 and/or network resources that would have otherwise been used to measure all beams included in the first set of beams and the second set of beams. This type of prediction may be referred to as a codebook based spatial domain selection or prediction. Other types of predictions or outputs are contemplated.

As another example, an output of the AI/ML model 410 may include a point-direction, an angle of departure (AoD), and/or an angle of arrival (AoA) of a beam included in the second set of beams. This type of prediction may be referred to as a non-codebook based spatial domain selection or prediction. As another example, multiple measurement report or values, collected at different points in time, may be input to the AI/ML model 410. This may enable the AI/ML model 410 to output codebook based and/or non-codebook based predictions for a measurement value, an AoD, and/or an AoA, among other examples, of a beam at a future time. The output(s) of the AI/ML model 410, as described herein in one example, may facilitate initial access procedures, secondary cell group (SCG) setup procedures, beam refinement procedures (e.g., a P2 beam management procedure or a P3 beam management procedure), link quality or interference adaptation procedure, beam failure and/or beam blockage predictions, and/or radio link failure predictions, among other examples.

In some examples, the first set of beams may be referred to as Set B beams and the second set of beams may be referred to as Set A beams. In some examples, the first set of beams (e.g., the Set B beams) may be a subset of the second set of beams (e.g., the Set A beams). In some other examples, the first set of beams and the second set of beams may be different beams and/or may be mutually exclusive sets. For example, the first set of beams (e.g., the Set B beams) may include wide beams (e.g., unrefined beams or beams having a beam width that satisfies a first threshold) and the second set of beams (e.g., the Set A beams) may include narrow beams (e.g., refined beams or beams having a beam width that satisfies a second threshold). In one example, the AI/ML model 410 may perform spatial-domain downlink beam predictions for beams included in the Set A beams based on measurement results of beams included in the Set B beams. As another example, the AI/ML model 410 may perform temporal downlink beam prediction for beams included in the Set A beams based on historic measurement results of beams included in the Set B beams.

As indicated above, FIG. 4 is provided as an example. Other examples may differ from what is described with regard to FIG. 4.

FIG. 5 is a diagram illustrating an example 500 of a representation of AI/ML models in a telecommunications network, in accordance with the present disclosure.

A set of physical AI/ML models may be deployed for use in a UE after training. For example, a computing device may host an AI/ML model and may provide access to the AI/ML model by network devices in a telecommunications network. Some physical AI/ML models may be transparent to the network devices. In other words, the computing devices that train and host the AI/ML models may periodically update and/or alter the AI/ML models without the network devices having awareness to the periodic updates or alterations. In contrast, the network devices, such as a network node 110 as described above, may have access to a set of AI/ML functionalities or a set of AI/ML models (that are not transparent to the network). A functionality may refer to an AI/ML enabled feature or feature group (FG), which is enabled by a configuration. The AI/ML functionalities may include a plurality of physical AI/ML models. A functionality may be identified with a set of conditions that correspond to a set of configurations that are supported by the UE. The AI/ML functionalities may be associated with functionality-based LCM. The AI/ML models that are deployed on the network, which are not transparent to the network and network nodes 110, may be logical entities (e.g., logical AI/ML models) that are associated with model identifiers (IDs). The AI/ML models on the network may be associated with a model ID-based LCM.

The AI/ML functionalities and models may have associated AI/ML-enabled features or FGs. The features or feature groups may include configurations, such as a number of antenna ports, a payload size of data, or another configuration parameter. Additionally, the features or feature groups may include a set of additional conditions that can be applied to the features or feature groups, such as conditions relating to scenarios, sites, datasets, or other dynamic updates. In other words, an AI/ML functionalities and model may be associated with specific configurations or conditions that are associated with a UE capability of an AI/ML enabled feature or feature group and that are associated with one or more additional conditions.

As indicated above, FIG. 5 is provided as an example. Other examples may differ from what is described with regard to FIG. 5.

As described above, a UE may identify functionalities that are configurable for an AI/ML-enabled feature or feature group. For example, the UE may identify functionalities based at least in part on a set of conditions. A network node may configure some functionalities among the identified functionalities based at least in part on information indicating the identified functionalities. Additionally, the network node may configure some functionalities based at least in part on a use case or scenario of the network node. The network node may activate a functionality of the configured functionalities, which may enable the functionality to be used to optimize performance of various network functions, such as beam selection, positioning, or channel state feedback, among other examples. There are different types of LCMs for AI/ML models such as functionality-based LCM and model ID-based LCM.

However, there is not a unified signaling framework for functionality-based LCM and model ID-based LCM.

Some aspects described herein enable a UE and a network to communicate to identify, activate, deactivate, select functionalities associated with AI/ML models, and/or fallback to non AI/ML algorithms. For example, a UE may identify one or more supportable AI/ML functionalities for an AI/ML-enabled feature, and may report the identified supportable AI/ML functionalities to a network node. The network node may configure these identified functionalities that can be represented as one or more logical AI/ML models with corresponding identifiers generated by network, and the network node may signal to the UE using RRC signaling. Based at least in part on the network node configuring and indicating the one or more logical AI/ML models for the UE, the network node may use the corresponding model identifiers for LCM signaling purposes, such as for activation, deactivation, selection, and/pr performance monitoring signaling. In this way, the UE and the network node implement a unified signaling procedure for functionality-based LCM and for model ID-based LCM. Based at least in part on enabling identification and activation, the UE and the network node improve a utilization of network resources and/or reduce a likelihood of dropped communications, by enabling use of AI/ML models, relative to non-AI/ML-based techniques for configuring network communications.

Figure 6A:
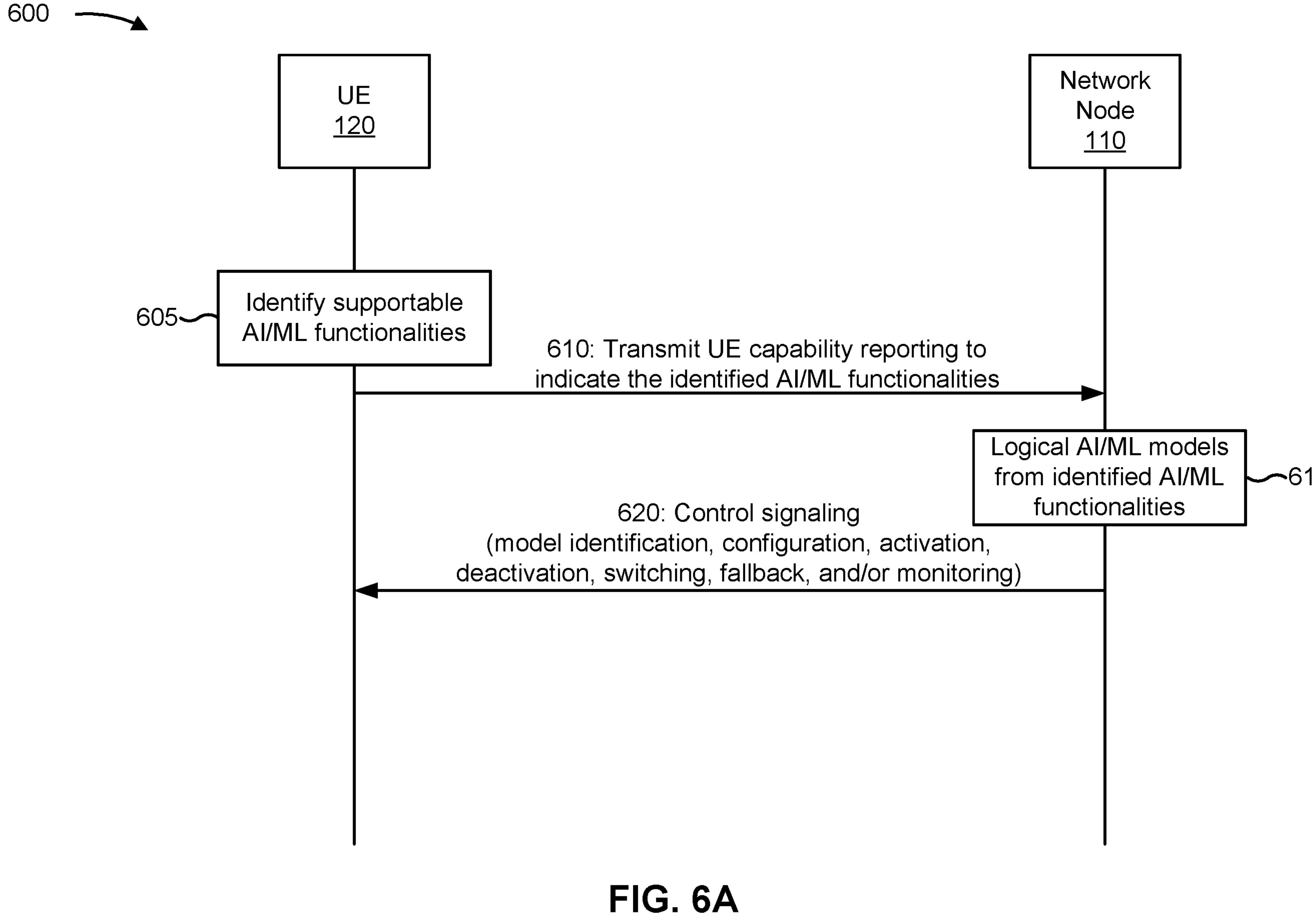
FIGS. 6A-6E are diagrams illustrating an example associated with model identification using a UE capability indicator, in accordance with the present disclosure.
Figure 6B:
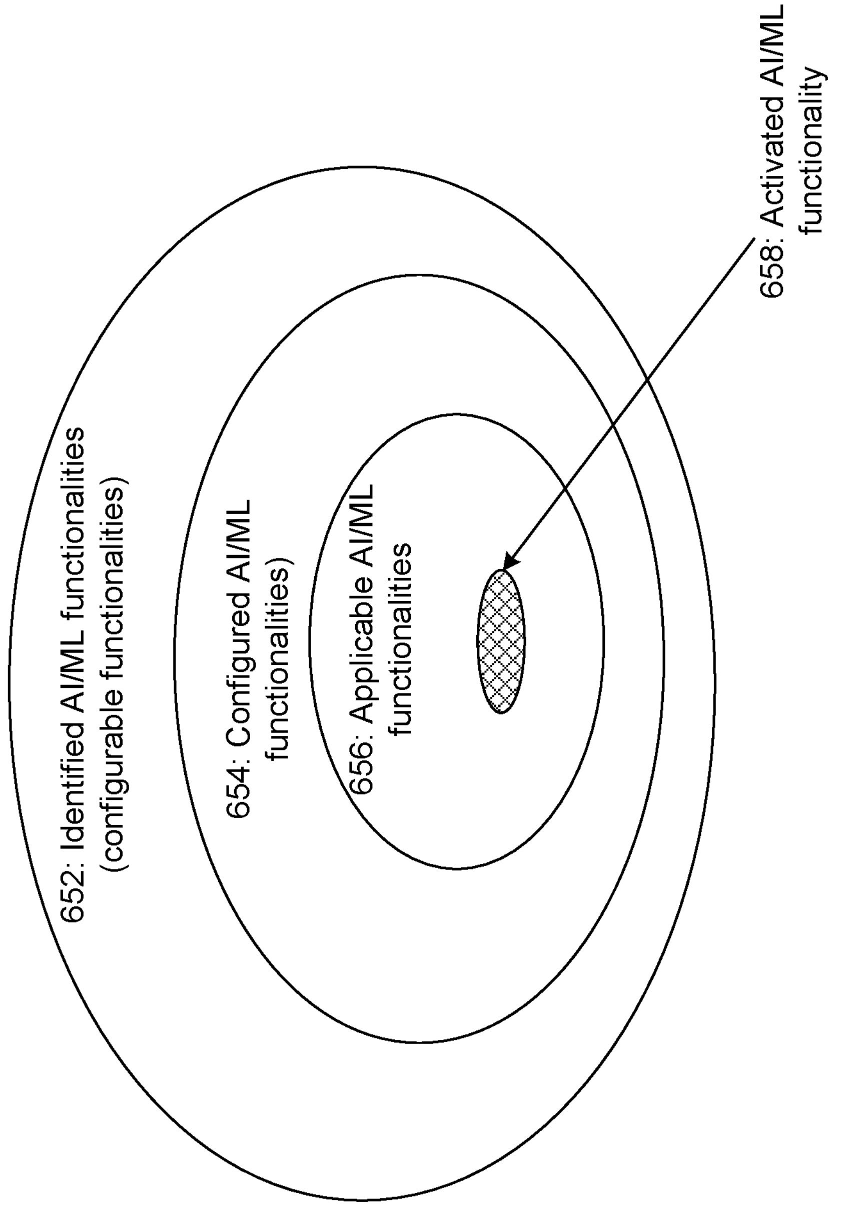

FIGS. 6A-6E are diagrams illustrating an example 600 associated with functionality/model identification using a UE capability framework, in accordance with the present disclosure. As shown in FIG. 6A, example 600 includes communication between a network node 110 and a UE 120.

As further shown in FIG. 6A and by reference numbers 605 and 610, the UE 120 may identify a first set of functionalities. For example, the UE 120 may identify supportable AI/ML functionalities and transmit UE capability reporting to indicate the identified AI/ML functionalities. The network node 110 may receive the UE capability reporting transmitted by the UE 120. For example, the UE 120 may identify one or more supportable AI/ML functionalities for an AI/ML-enabled feature. In this case, the UE 120 may identify sets of one or more supportable AI/ML functionalities for sets of AI/ML-enabled features. In other words, the UE 120 may determine that, for each AI/ML-enabled feature, there are one or more AI/ML functionalities that can be configured, by the network node 110, for the UE 120.

In some aspects, the one or more supportable AI/ML functionalities may be related to a set of UE conditions. For example, the one or more supportable AI/ML functionalities may be related to scenarios, locations, datasets, configurations (e.g., a quantity of antenna ports or a payload size of data), or other types of conditions. In some aspects, the one or more supportable AI/ML functionalities may be related to a set of model features. For example, different models may have different sets of features or feature groups that may relate to different supportable AI/ML functionalities.

In some aspects, the UE 120 may indicate the identified AI/ML functionalities via a UE capability reporting framework. For example, the UE 120 may transmit, and the network node 110 may receive, a UE capability reporting message (e.g., a message that includes a UE capability indicator) and may set one or more fields of the UE capability reporting message to one or more values to indicate one or more identified AI/ML functionalities. In some aspects, the UE 120 may assign identifiers to the one or more identified AI/ML functionalities. For example, the UE 120 may assign an identifier to an identified AI/ML functionality and may transmit information conveying the identifier to indicate that the AI/ML functionality has been identified as configurable for the UE 120 or supportable by the UE 120.

In another example, rather than the UE 120 indicating the identified AI/ML functionalities to the network node 110 (e.g., via the UE capability reporting framework), the network node 110 may identify a first set of functionalities, such as the one or more identified AI/ML functionalities. In this case, the network node 110 may select and indicate an activated AI/ML functionality, as described below. Further to this example, the UE 120 may, in some aspects, transmit a message identifying a UE capability. For example, the UE 120 may indicate the UE capability and/or one or more UE conditions that the network node 110 may use to identify and/or select an AI/ML functionality.

As further shown in FIG. 6A, and by reference numbers 615 and 620, the network node 110 may have one or more logical AI/ML models and may transmit control signaling to the UE 120. For example, the network node 110 may generate a logical entity corresponding to one or more AI/ML models and representing one or more AI/ML functionalities identified by the UE 120. In this case, each of the logical AI/ML models is a logical entity representing a particular functionality. In some aspects, the network node 110 may assign a functionality identifier, which may be a logical model identifier, to a logical AI/ML model. For example, the network node 110 may receive information conveying an indicator of an AI/ML functionality, instantiate a logical AI/ML model representing the AI/ML functionality, and assign a model identifier to the logical AI/ML model. In this case, the model identifier corresponds to the indicator of the AI/ML functionality (e.g., according to a one-to-one correspondence).

In some aspects, the UE 120 may receive, from the network node 110, control signaling identifying a configuration of a set of logical AI/ML models. For example, as shown with regard to FIG. 6B, the UE 120 may transmit UE capability reporting identifying a set of AI/ML functionalities 652, the network node 110 may generate one or more logical AI/ML models corresponding to a subset of the set of AI/ML functionalities 652, and the network node 110 may transmit control signaling indicating model identifiers for one or more logical AI/ML models, which represent one or more configured AI/ML functionalities 654. The one or more configured AI/ML functionalities 654 may include functionalities that are configured (e.g., by the network node 110 among the identified functionalities). Accordingly, as shown, the one or more configured AI/ML functionalities 654 are a subset of the one or more identified AI/ML functionalities 652. The UE 120 and/or the network node 110 may determine that, of the configured AI/ML functionalities 654, a subset are applicable to the UE 120 (e.g., based at least in part on one or more configurations or conditions), which may be applicable AI/ML functionalities 656. The one or more applicable AI/ML functionalities 656 may include functionalities that are currently applicable (e.g., as determined by the network node 110 or the UE 120 from among the configured functionalities) at the UE 120. Of the applicable AI/ML functionalities 656, the network node 110 may transmit control signaling conveying a model identifier to change an activation status (e.g., activate or deactivate) an AI/ML functionality at the UE 120, which may be the activated AI/ML functionality 658.

Figure 6C:
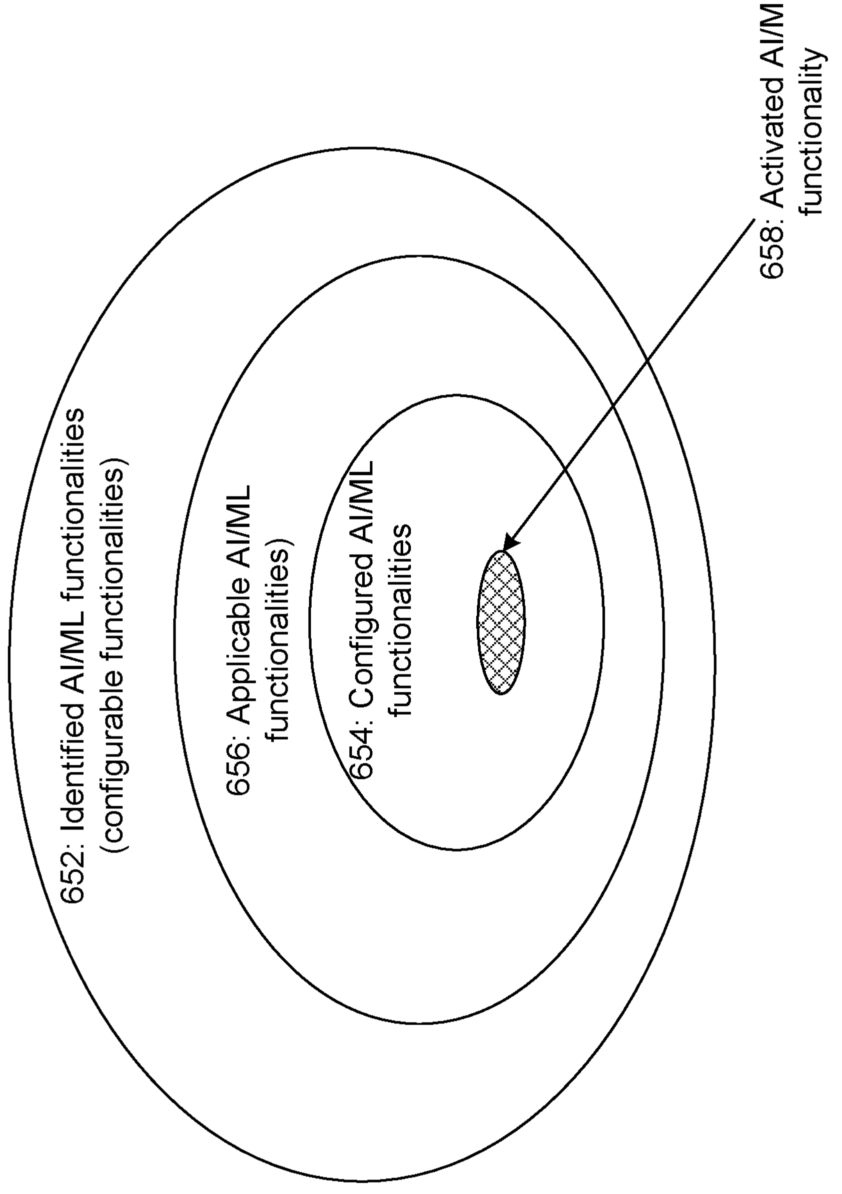
Figure 6D:
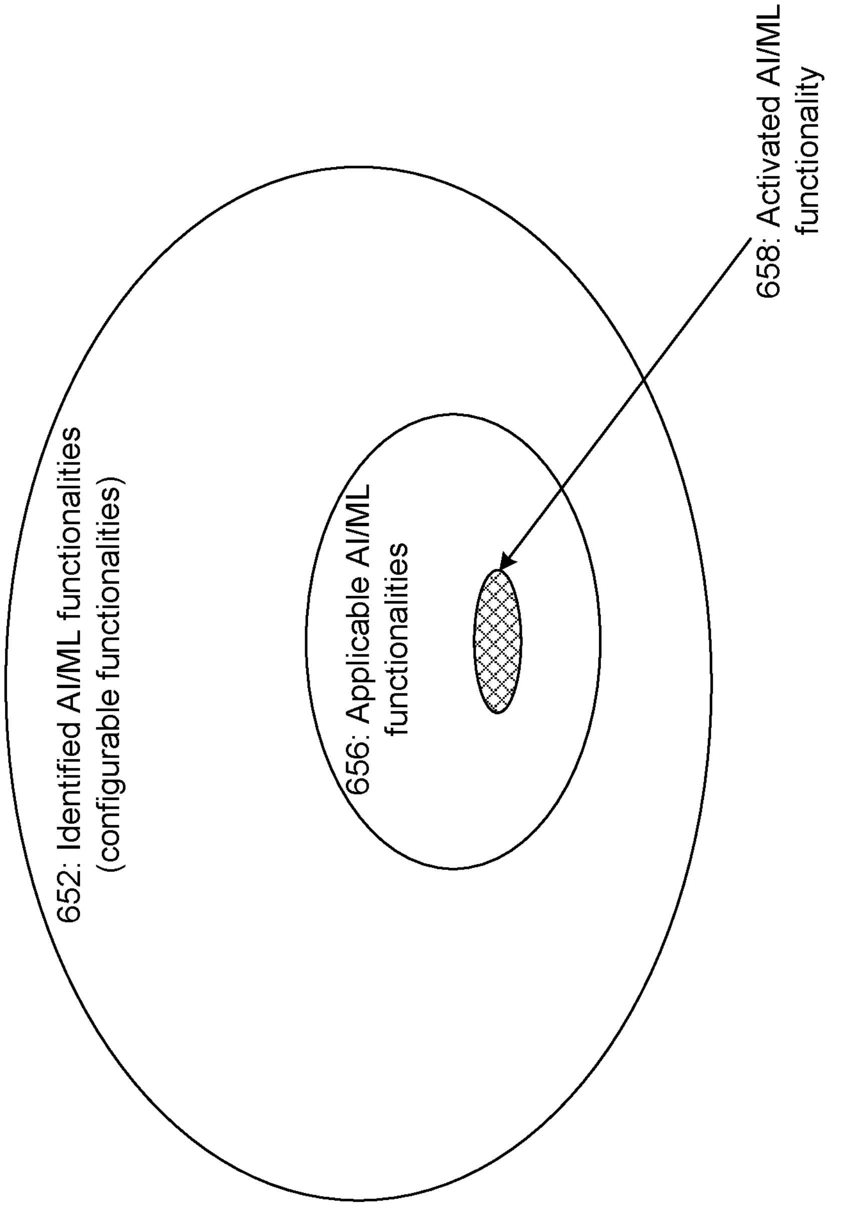

Other types of hierarchical abstractions of a signaling flow relating to identification, selection, configuration, and/or activation of an AI/ML functionality are possible. For example, as shown in FIG. 6C, rather than the one or more applicable AI/ML functionalities 656 being a subset of the one or more configured functionalities 654, the one or more configured functionalities 654 may be a subset of the one or more applicable functionalities 656. In this case, AI/ML functionalities that are configured for the UE 120, and from which the activated AI/ML functionality 658 is selected (e.g., by the UE 120 or the network node 110) are a subset of identified AI/ML functionalities that are applicable to a UE capability, or set of UE conditions. In another example, as shown in FIG. 6D, the one or more applicable AI/ML functionalities 654 may be a subset of the set of identified AI/ML functionalities 652 (e.g., without the one or more configured functionalities 654 being determined). In this case, a group of AI/ML functionalities may not be configured separate from a determination of AI/ML functionalities that are applicable to a UE capability, or set of UE conditions. Accordingly, the activated AI/ML functionality 658 is selected from the one or more applicable AI/ML functionality 656.

Figure 6E:
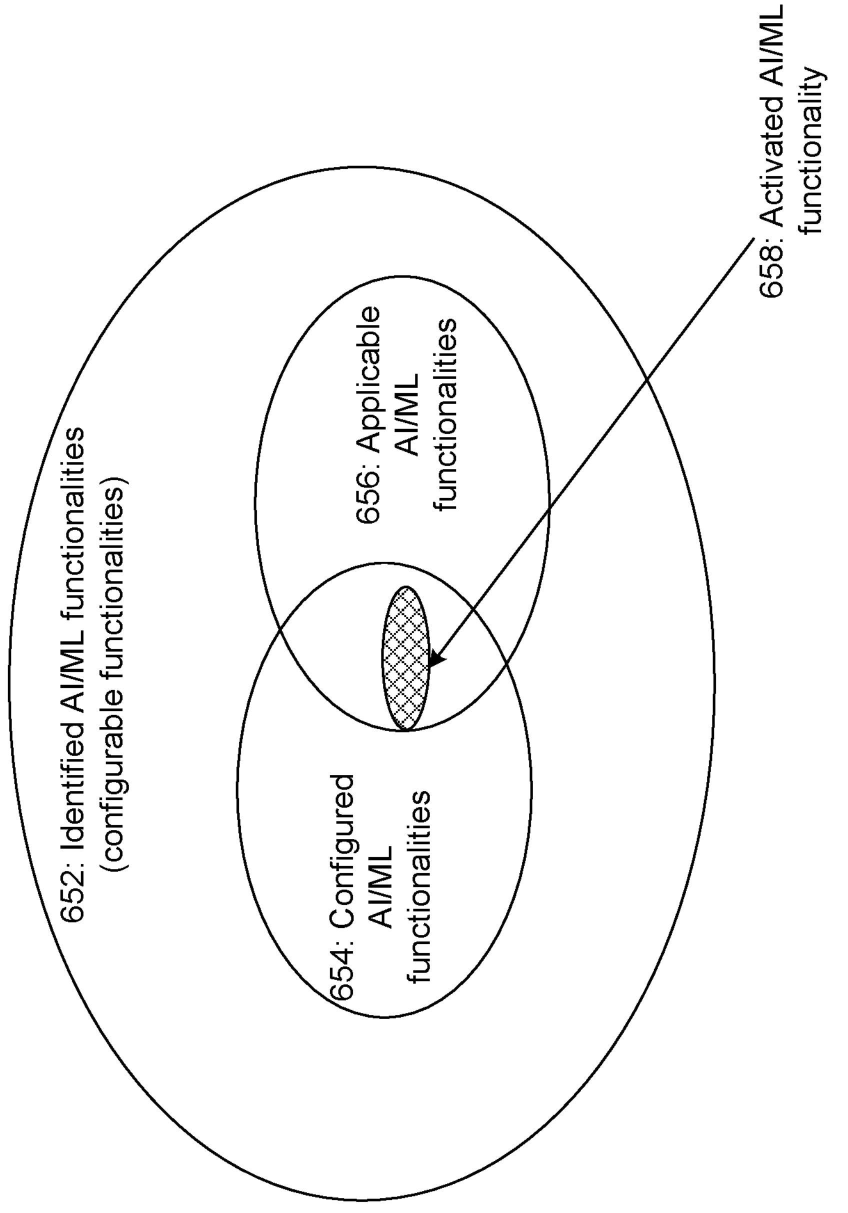

In another example, as shown in FIG. 6E, the one or more applicable AI/ML functionalities 654 and the one or more configured functionalities 656 may be two partially overlapping groups of AI/ML functionalities. In this example, the activated AI/ML functionality 658 is selected (e.g., by the network node 110 or the UE 120) from an overlap of the one or more applicable AI/ML functionalities 654 and the one or more configured functionalities 656). In other words, there may be some configured, identified AI/ML functionalities that are not applicable to a particular use case, UE capability, or set of UE conditions and some identified functionalities that are applicable to the particular use case, UE capability, or set of UE conditions without having been configured for the UE 120.

Additionally, or alternatively, the network node 110 may transmit control signaling to cause the UE 120 to switch from a first AI/ML functionality to a second AI/ML functionality or to monitor a performance of an AI/ML functionality. For example, the network node 110 may transmit control signaling that includes activation information, deactivation information, switching information, fallback information, or monitoring information, which the UE 120 may use to control one or more AI/ML functionalities. In other words, based at least in part on assigning a functionality identifier, as a logical model identifier, for an AI/ML functionality, which is represented as a logical AI/ML model, the UE 120 and the network node 110 can use model-based control signaling to control AI/ML functionalities, thereby unifying signaling frameworks of AI/ML models and AI/ML functionalities.

In some aspects, the network node may transmit the control signaling based on receiving a UE message and identifying one or more AI/ML models. For example, when the network node 110 is configured to identify an AI/ML model, the UE 120 may transmit information identifying a UE capability, the network node 110 may identify and select an AI/ML model, and the network node 110 may transmit information identifying the selection of the AI/ML model.

As indicated above, FIGS. 6A-6E are provided as examples. Other examples may differ from what is described with respect to FIGS. 6A-6E.

FIG. 7 is a diagram illustrating an example process 700 performed, for example, by a UE, in accordance with the present disclosure. Example process 700 is an example where the UE (e.g., UE 120) performs operations associated with functionality/model identification using user equipment capability indicator.

As shown in FIG. 7, in some aspects, process 700 may include transmitting a UE capability reporting message including information associated with identifying a set of UE conditions associated with a first set of functionalities, wherein the first set of functionalities corresponds to a set of model features (block 710). For example, the UE (e.g., using transmission component 904 and/or communication manager 906, depicted in FIG. 9) may transmit a UE capability reporting message including information associated with identifying a set of UE conditions associated with a first set of functionalities, wherein the first set of functionalities corresponds to a set of model features, as described above. In some aspects, the UE may transmit information identifying a set of identified functionalities to a network node. Additionally, or alternatively, the UE may transmit information identifying a UE capability or a set of UE conditions, based on which the network node 110 may perform one or more determinations.

As further shown in FIG. 7, in some aspects, process 700 may include receiving, based at least in part on transmitting the UE capability reporting message, control signaling identifying a second set of functionalities that is a subset of the first set of functionalities (block 720). For example, the UE (e.g., using reception component 902 and/or communication manager 906, depicted in FIG. 9) may receive, based at least in part on transmitting the UE capability reporting message, control signaling identifying a second set of functionalities that is a subset of the first set of functionalities, as described above. In some aspects, the UE may receive information identifying a configured, applicable, or activated functionality. Additionally, or alternatively, the UE 120 may receive information identifying at least one functionality from which the UE may select or activate a particular functionality.

Process 700 may include additional aspects, such as any single aspect or any combination of aspects described below and/or in connection with one or more other processes described elsewhere herein.

In a first aspect, process 700 includes determining the first set of functionalities for the set of UE conditions, and determining a correspondence between the first set of functionalities and a UE capability based at least in part on determining the first set of functionalities, and transmitting the UE capability reporting message comprises transmitting the UE capability reporting message to identify information associated with the correspondence.

In a second aspect, alone or in combination with the first aspect, the control signaling includes at least one of activation information, deactivation information, switching information, fallback information, or monitoring information.

In a third aspect, alone or in combination with one or more of the first and second aspects, each functionality, of the first set of functionalities, corresponds to one or more logical entities, each logical entity being assigned with an identifier corresponding to a functionality identifier of a corresponding configured functionality of the second set of functionalities.

In a fourth aspect, alone or in combination with one or more of the first through third aspects, process 700 includes receiving radio resource control configuration signaling identifying an assignment of each logical entity to a functionality identifier of each second functionality of the second set of functionalities.

In a fifth aspect, alone or in combination with one or more of the first through fourth aspects, the control signaling is associated with a format that is applicable to the second set of functionalities and to a set of logical entities including the one or more models.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a network node, in accordance with the present disclosure. Example process 800 is an example where the network node (e.g., network node 110) performs operations associated with model identification using user equipment capability indicator.

As shown in FIG. 8, in some aspects, process 800 may include receiving a UE capability reporting message including a first set of functionalities for a set of UE conditions, wherein the first set of functionalities corresponds to a set of model features (block 810). For example, the network node (e.g., using reception component 1002 and/or communication manager 1006, depicted in FIG. 10) may receive a UE capability reporting message including a first set of functionalities for a set of UE conditions, wherein the first set of functionalities corresponds to a set of model features, as described above.

As further shown in FIG. 8, in some aspects, process 800 may include transmitting, based at least in part on transmitting the UE capability reporting message, control signaling identifying a second set of functionalities that is a subset of the first set of functionalities (block 820). For example, the network node (e.g., using transmission component 1004 and/or communication manager 1006, depicted in FIG. 10) may transmit, based at least in part on transmitting the UE capability reporting message, control signaling identifying a second set of functionalities that is a subset of the first set of functionalities, as described above.

Process 800 may include additional aspects, such as any single aspect or any combination of aspects described below and/or in connection with one or more other processes described elsewhere herein.

In a first aspect, process 800 includes selecting the subset of the first set of functionalities, and transmitting the control signaling comprises transmitting the control signaling based at least in part on selecting the subset of the first set of functionalities.

In a second aspect, alone or in combination with the first aspect, the control signaling includes at least one of activation information, deactivation information, switching information, fallback information, or monitoring information.

In a third aspect, alone or in combination with one or more of the first and second aspects, each functionality, of the first set of functionalities, corresponds to one or more logical entities, each logical entity being assigned with an identifier corresponding to a functionality identifier of a corresponding configured functionality of the second set of functionalities.

In a fourth aspect, alone or in combination with one or more of the first through third aspects, process 800 includes transmitting radio resource control configuration signaling identifying an assignment of each logical entity to a functionality identifier of each second functionality of the second set of functionalities.

In a fifth aspect, alone or in combination with one or more of the first through fourth aspects, the control signaling is associated with a format that is applicable to the second set of functionalities and to a set of logical entities including the one or more models.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
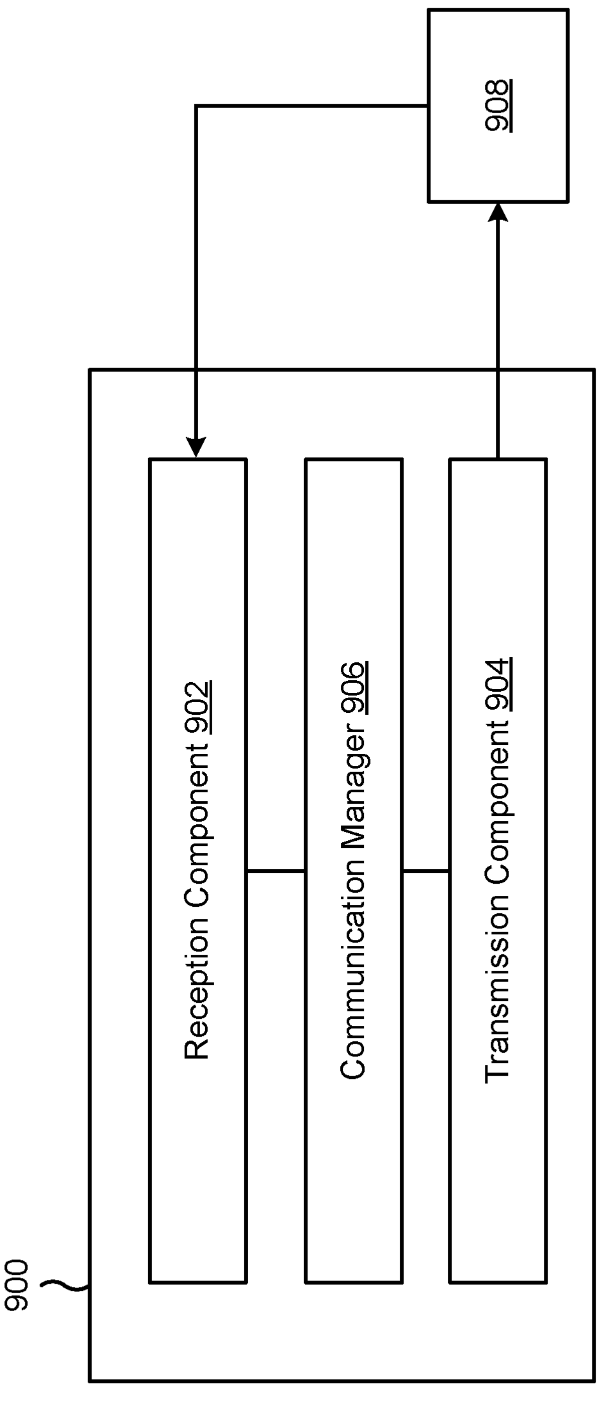
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 6A-6E. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The transmission component 904 may transmit a UE capability reporting message including a first set of functionalities for a set of UE conditions, wherein the first set of functionalities corresponds to a set of model features. The reception component 902 may receive, based at least in part on transmitting the UE capability reporting message, control signaling identifying a second set of functionalities that is a subset of the first set of functionalities.

The communication manager 906 may determine the first set of functionalities for the set of UE conditions. The communication manager 906 may determine a correspondence between the first set of functionalities and a UE capability based at least in part on determining the first set of functionalities. The reception component 902 may receive radio resource control configuration signaling identifying an assignment of each logical entity to a functionality identifier of each second functionality of the second set of functionalities.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
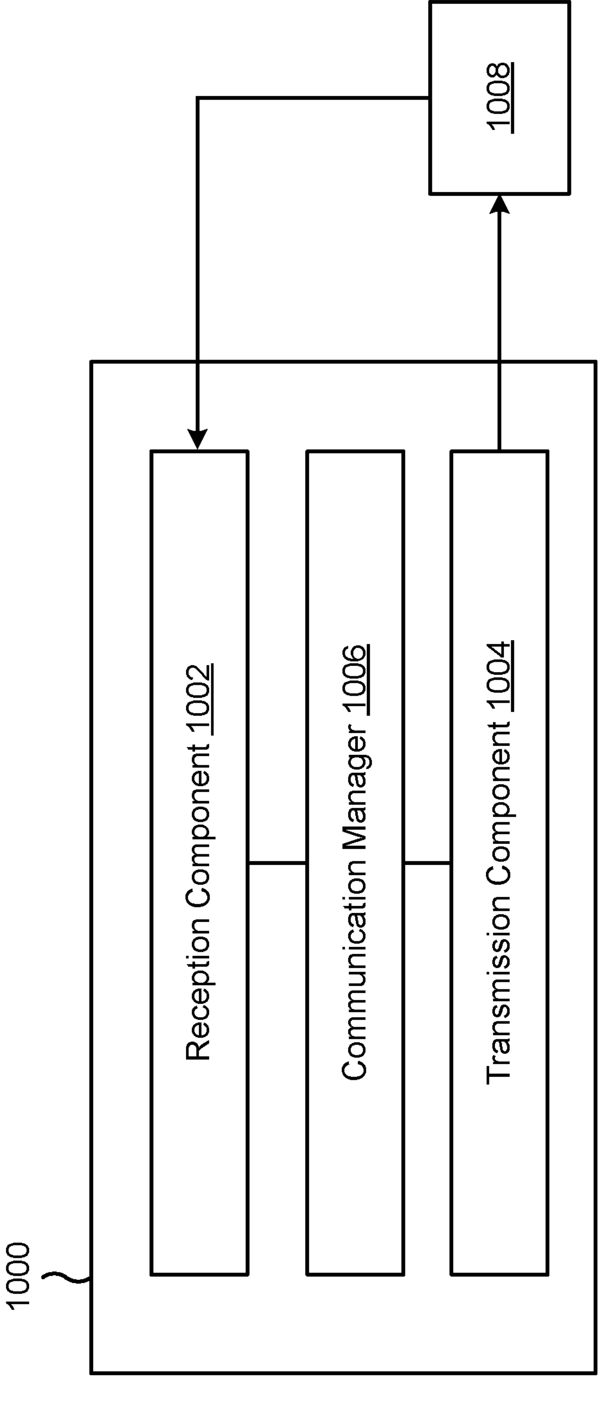
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 6A-6E. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive a UE capability reporting message including a first set of functionalities for a set of UE conditions, wherein the first set of functionalities corresponds to a set of model features. The transmission component 1004 may transmit, based at least in part on transmitting the UE capability reporting message, control signaling identifying a second set of functionalities that is a subset of the first set of functionalities.

The communication manager 1006 may select the subset of the first set of functionalities. The transmission component 1004 may transmit radio resource control configuration signaling identifying an assignment of each logical entity to a functionality identifier of each second functionality of the second set of functionalities.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting a UE capability reporting message including a first set of functionalities for a set of UE conditions, wherein the first set of functionalities corresponds to a set of model features; and receiving, based at least in part on transmitting the UE capability reporting message, control signaling identifying a second set of functionalities that is a subset of the first set of functionalities.

Aspect 2: The method of Aspect 1, further comprising: determining the first set of functionalities for the set of UE conditions; and determining a correspondence between the first set of functionalities and a UE capability based at least in part on determining the first set of functionalities; and wherein transmitting the UE capability reporting message comprises: transmitting the UE capability reporting message to identify information associated with the correspondence.

Aspect 3: The method of any of Aspects 1-2, wherein the control signaling includes at least one of: activation information, deactivation information, switching information, fallback information, or monitoring information.

Aspect 4: The method of any of Aspects 1-3, wherein each functionality, of the first set of functionalities, corresponds to one or more logical entities, each logical entity being assigned with an identifier corresponding to a functionality identifier of a corresponding configured functionality of the second set of functionalities.

Aspect 5: The method of Aspect 4, further comprising: receiving radio resource control configuration signaling identifying an assignment of each logical entity to a functionality identifier of each second functionality of the second set of functionalities.

Aspect 6: The method of Aspect 4, wherein the control signaling is associated with a format that is applicable to the second set of functionalities and to a set of logical entities including the one or more models.

Aspect 7: A method of wireless communication performed by a network node, comprising: receiving a UE capability reporting message including a first set of functionalities for a set of UE conditions, wherein the first set of functionalities corresponds to a set of model features; and transmitting, based at least in part on transmitting the UE capability reporting message, control signaling identifying a second set of functionalities that is a subset of the first set of functionalities.

Aspect 8: The method of Aspect 7, further comprising: selecting the subset of the first set of functionalities; and wherein transmitting the control signaling comprises: transmitting the control signaling based at least in part on selecting the subset of the first set of functionalities.

Aspect 9: The method of any of Aspects 7-8, wherein the control signaling includes at least one of: activation information, deactivation information, switching information, fallback information, or monitoring information.

Aspect 10: The method of any of Aspects 7-9, wherein each functionality, of the first set of functionalities, corresponds to one or more logical entities, each logical entity being assigned with an identifier corresponding to a functionality identifier of a corresponding configured functionality of the second set of functionalities.

Aspect 11: The method of Aspect 10, further comprising: transmitting radio resource control configuration signaling identifying an assignment of each logical entity to a functionality identifier of each second functionality of the second set of functionalities.

Aspect 12: The method of Aspect 10, wherein the control signaling is associated with a format that is applicable to the second set of functionalities and to a set of logical entities including the one or more models.

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:
one or more antennas; and
a processing system that includes one or more processors and one or more memories that store code for the one or more processors, the processing system configured to cause the UE to:
transmit a UE capability reporting message including information associated with identifying a set of UE conditions associated with a first set of functionalities, wherein the first set of functionalities corresponds to a set of model features; and
receive, based at least in part on a transmission of the UE capability reporting message, control signaling identifying a set of second functionalities that is a subset of the first set of functionalities,
wherein each functionality, of the first set of functionalities, corresponds to one or more logical entities, each logical entity being assigned with an identifier corresponding to a functionality identifier of a corresponding second functionality of the second set of functionalities.

2. The UE of claim 1, wherein the processing system is further configured to cause the UE to:
determine the first set of functionalities for the set of UE conditions; and
determine a correspondence between the first set of functionalities and a UE capability based at least in part on determining the first set of functionalities; and
wherein the processing system, when configured to cause the UE to transmit the UE capability reporting message, is configured to cause the UE to:
transmit the UE capability reporting message to identify information associated with the correspondence.

3. The UE of claim 1, wherein the first set of functionalities is derived based on a correspondence between the set of UE conditions and the first set of functionalities.

4. The UE of claim 1, wherein the control signaling includes at least one of:
activation information,
deactivation information,
switching information,
fallback information, or
monitoring information.

5. The UE of claim 1, wherein the processing system is further configured to cause the UE to:
receive radio resource control configuration signaling identifying an assignment of each logical entity to a functionality identifier of each second functionality of the second set of functionalities.

6. The apparatus of claim 1, wherein the control signaling is associated with a format that is applicable to the second set of functionalities and to a set of logical entities associated with one or more models.

7. The UE of claim 1, wherein the set of UE conditions includes at least one of scenarios, locations, datasets, or configurations.

8. A network node, comprising:
one or more antennas; and
a processing system that includes one or more processors and one or more memories that store code for the one or more processors, the processing system configured to cause the network node to:
receive a user equipment (UE) capability reporting message including information associated with identifying a set of UE conditions associated with a first set of functionalities, wherein the first set of functionalities corresponds to a set of model features; and
transmit, based at least in part on a reception of the UE capability reporting message, control signaling identifying a second set of functionalities that is a subset of the first set of functionalities,
wherein each functionality, of the first set of functionalities, corresponds to one or more logical entities, each logical entity being assigned with an identifier corresponding to a functionality identifier of a corresponding second functionality of the second set of functionalities.

9. The network node of claim 8, wherein the processing system is further configured to cause the network node to:
determine the first set of functionalities based on the set of UE conditions; and
wherein the processing system, when configured to cause the network node to transmit the control signaling, is configured to cause the network node to:
transmit the control signaling based at least in part on determining the first set of functionalities.

10. The network node of claim 8, wherein the processing system is further configured to cause the network node to:
determine a correspondence between the set of UE conditions and the first set of functionalities; and
wherein the processing system, when configured to cause the network node to determine the first set of functionalities, is further configured to cause the network node to:
determine the first set of functionalities based on the correspondence between the set of UE conditions and the first set of functionalities.

11. The network node of claim 8, wherein the processing system is further configured to cause the network node to:
select the subset of the first set of functionalities; and
wherein the processing system, when configured to cause the network node to transmit the control signaling, is configured to cause the network node to:
transmit the control signaling based at least in part on selecting the subset of the first set of functionalities.

12. The network node of claim 8, wherein the control signaling includes at least one of:
activation information,
deactivation information,
switching information,
fallback information, or
monitoring information.

13. The network node of claim 8, wherein the processing system is further configured to cause the network node to:
transmit radio resource control configuration signaling identifying an assignment of each logical entity to a functionality identifier of each second functionality of the second set of functionalities.

14. The apparatus of claim 8, wherein the control signaling is associated with a format that is applicable to the second set of functionalities and to a set of logical entities associated with one or more models.

15. The network node of claim 8, wherein the set of UE conditions includes at least one of scenarios, locations, datasets, or configurations.

16. A method of wireless communication, performed by a user equipment (UE), comprising:
transmitting a UE capability reporting message including information associated with identifying a set of UE conditions associated with a first set of functionalities, wherein the first set of functionalities corresponds to a set of model features; and receiving, based at least in part on transmitting the UE capability reporting message, control signaling identifying a set of second functionalities that is a subset of the first set of functionalities, wherein each functionality, of the first set of functionalities, corresponds to one or more logical entities, each logical entity being assigned with an identifier corresponding to a functionality identifier of a corresponding second functionality of the second set of functionalities.

17. The method of claim 16, further comprising:

determining the first set of functionalities for the set of UE conditions; and determining a correspondence between the first set of functionalities and a UE capability based at least in part on determining the first set of functionalities; and wherein transmitting the UE capability reporting message comprises:

transmitting the UE capability reporting message to identify information associated with the correspondence.

18. The method of claim 16, wherein the first set of functionalities is derived based on a correspondence between the set of UE conditions and the first set of functionalities.

19. The method of claim 16, wherein the control signaling includes at least one of:

activation information,
deactivation information,
switching information,
fallback information, or
monitoring information.

20. The method of claim 16, further comprising:

receiving radio resource control configuration signaling identifying an assignment of each logical entity to a functionality identifier of each second functionality of the second set of functionalities.

* * * * *